WOOD & ROSEBROOK.
Mower.
No. 24,836.
Patented July 19, 1859.
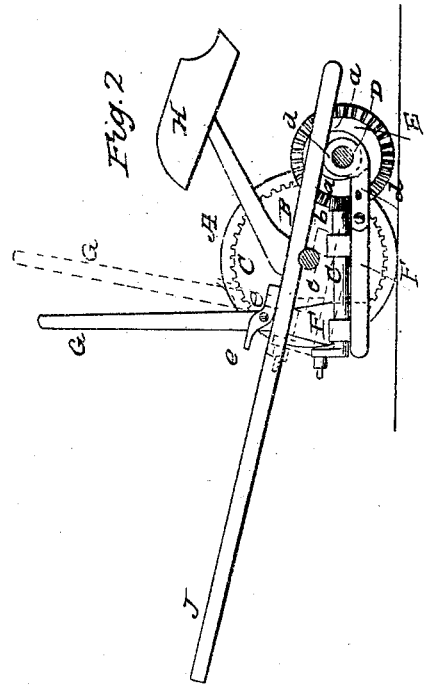
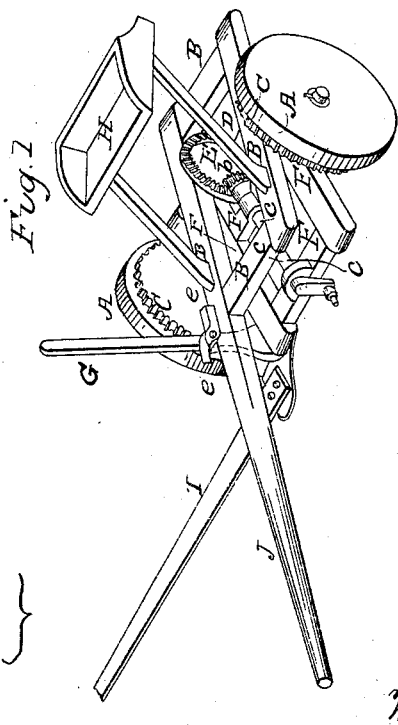
WITNESSES
INVENTORS
W. A. Wood
J. W. Rosebrook

UNITED STATES PATENT OFFICE.

W. A. WOOD AND J. M. ROSEBROOKS, OF HOOSICK FALLS, NEW YORK.

IMPROVEMENT IN HARVESTERS.

Specification forming part of Letters Patent No. 24,836, dated July 19, 1859.

*To all whom it may concern:*

Be it known that we, W. A. WOOD and J. M. ROSEBROOKS, of Hoosick Falls, in the county of Rensselaer and State of New York, have invented certain new and useful Improvements in Grass-Harvesters; and we do hereby declare the following to be a full, clear, and exact description of the construction and operation of the same, reference being had to the accompanying drawings, making a part of this specification, in which—

Figure 1 represents in perspective so much of a harvesting-machine as will illustrate our invention. Fig. 2 represents a section through the same.

Similar letters of reference, where they occur in the separate figures, denote like parts of the machine in both the figures.

Our invention consists in the use of two frames, one hinged to the other, and each carrying a part of the gearing, but so that while one frame may move or play upon the other the gearing on each will continue in mesh, as will be explained.

To enable others skilled in the art to make and use our invention, we will proceed to describe the same with reference to the drawings.

A A represent a pair of driving and supporting wheels, the axle or axles of which support the main frame B, said wheels being each furnished with driving-gear C. To the rear portion of this main frame is hung, in suitable boxes, $a$, a shaft, D, each end of which carries a spur-gear wheel, that the gearings C take into, and thus drive said shaft. On the center of this shaft D, or near its center, there is a bevel-gear, E, that takes into and rotates the bevel-pinion $b$ on the crank-shaft $c$, and thus drives said crank-shaft, and through it the cutters.

F is a second frame, which is hinged to the axle or shaft D by arms $d$, and this second frame carries the crank-shaft $c$ and its bevel-pinion, while the other gearing is connected to the main frame. The center of the crank-shaft $c$ points to the center of the shaft D, and it is consequently immaterial how much the second frame may swing on or around the shaft D, as the bevel-pinion $b$ will roll on the bevel-gear E and still keep in mesh with it.

The finger-beam I, cutters, &c., are connected to this second frame, F, and may oscillate the frame, and the cutters still be kept in action, as the crank-shaft moves with them and keeps its pinion in gear with the drivers.

G is a lever attached to the second frame and extending up into convenient position for the driver or conductor from his seat H to catch and operate.

On the lever is a hinged trigger, $e$, which, when the second frame is raised up, may be turned so as to rest against the main frame, and thus hold up the second frame and the cutters above the ground when the machine is being transported from field to field, or when turning it around. When the cutters are to be let down the conductor, with his foot, may turn the trigger $e$, and this lets the cutters down upon the ground. The finger-beam rises and falls or yields to all the inequalities of the ground, and of course carries with it the second frame; but the motion of the cutters continues nevertheless, for though the pinion $b$ rolls on the bevel-gear E, it is still driven by it. J is the tongue. It is rigidly fixed to the main frame B.

It is obvious that any other device than the one specified for raising the frame may be substituted for the lever, and that the frame may be of different construction; but so long as a hinged frame having the essential properties of ours be used, whether with the raising device or not, we would deem it as our invention and claim it as such.

Having thus fully described the nature and object of our invention, what we claim therein as new, and desire to secure by Letters Patent, is—

In combination with a main frame supported upon two driving-wheels, and which frame carries the shaft D and main cog-wheel E, a second frame hinged to said shaft D, so that the crank-shaft on said second frame shall always be in a radial line to the main cog-wheel E, however much said second frame may vibrate on the main frame, as set forth.

W. A. WOOD.
J. M. ROSEBROOKS.

Witnesses:
T. B. COOLEY,
LEW KING.